United States Patent [19]

Ellens

[11] 4,169,614
[45] Oct. 2, 1979

[54] SEAT BELT ASSEMBLY

[75] Inventor: Gordon A. Ellens, Grand Rapids, Mich.

[73] Assignee: U.S. Industries Inc., Grand Rapids, Mich.

[21] Appl. No.: 733,952

[22] Filed: Oct. 19, 1976

[51] Int. Cl.$^2$ ............................................. B60R 21/10
[52] U.S. Cl. ................................................... 280/801
[58] Field of Search ............... 280/747, 744; 297/388; 296/31 P; 174/46

[56] References Cited

U.S. PATENT DOCUMENTS

| 2,049,145 | 7/1936 | Warren et al. | 174/46 |
| 4,070,038 | 1/1978 | Bergman et al. | 280/744 |

Primary Examiner—Robert R. Song

[57] ABSTRACT

The specification discloses an elongated metal strap with wiring along its length all molded in place and encapsulated in a plastic material. The strap is anchored to the vehicle and the free end includes either a belt buckle or a latch. Preferably, the strap includes a longitudinal channel and the wiring is located within the channel.

9 Claims, 8 Drawing Figures

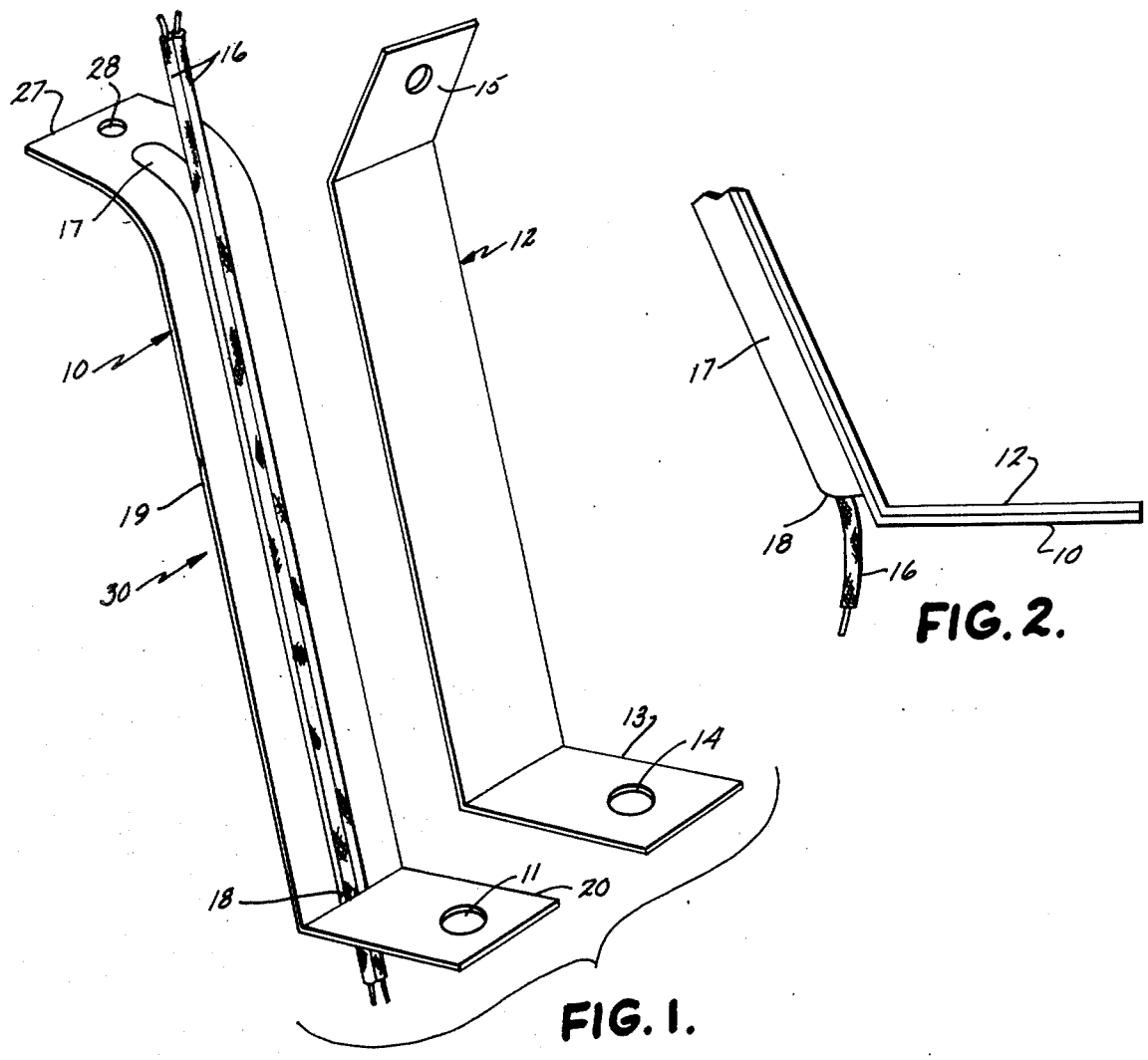
FIG. 2.
FIG. 1.
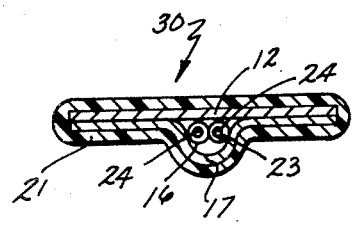
FIG. 4.
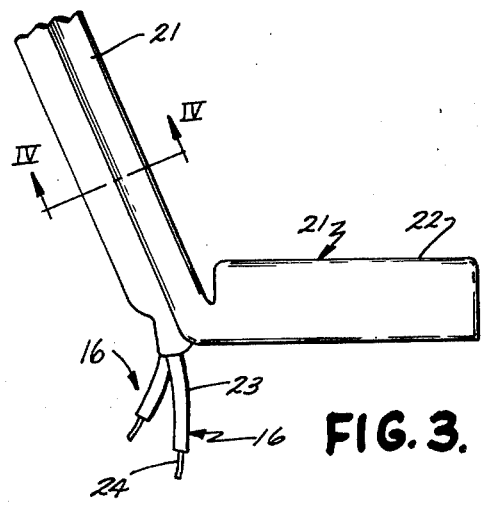
FIG. 3.

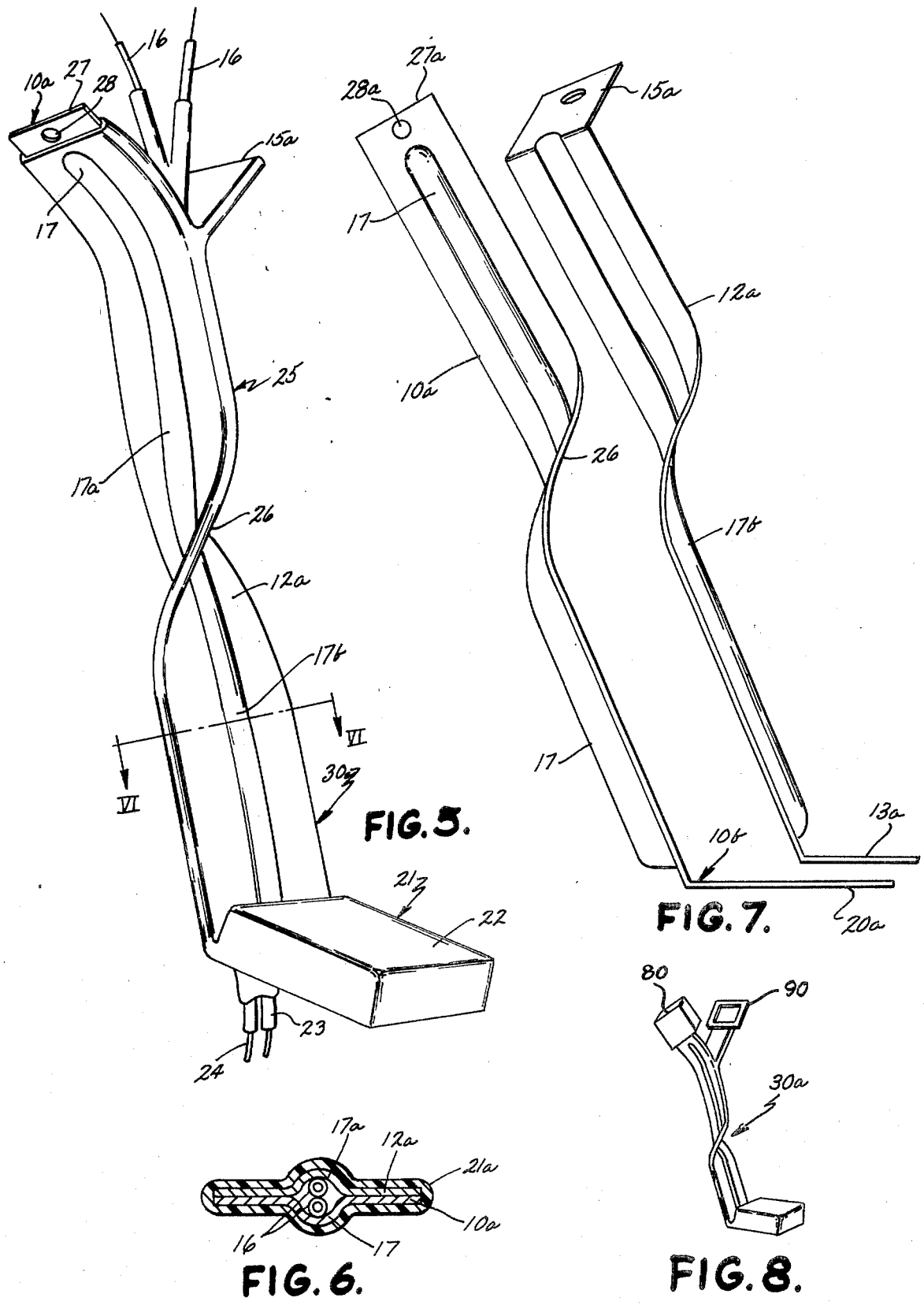

SEAT BELT ASSEMBLY

BACKGROUND OF THE INVENTION

This invention relates to vehicle occupant restraining devices; specifically, to seat belts.

One type of seat belt system used today has a molded hollow housing which is slipped over a seat belt. The seat belt is anchored to the floor of the automobile by a bolt and, typically, the housing also slips over the bolt. Electrical wiring to a seat belt buckle coupled to the seat belt, commonly used to provide information about whether the seat belt is fastened or not, is sewn into the fabric seat belt material. The steps of sewing the wire into the seat belt material and threading the seat belt through the hollow housing add to the cost of manufacturing a vehicle. This additional cost is significant to an automobile manufacturing company in view of the large number of units produced.

SUMMARY OF THE INVENTION

In the present invention, the fabric seat belt, the sewn in wiring and the separately molded housing are all eliminated. Instead, the present invention comprises a metal, or other like integral heat resistant material, strap and electrical wiring extending along the length thereof, all molded in place in an encapsulating plastic material, to give the entire assembly an attractive appearance and a softer, more forgiving feeling.

BRIEF DESCRIPTION OF THE DRAWINGS

FIG. 1 is an exploded view of a portion of a seat belt assembly prior to encapsulation in accordance with an embodiment of this invention;

FIG. 2 is a partial side elevational view of said portion of a seat belt assembly in accordance with an embodiment of this invention;

FIG. 3 is a partial side elevational view of a seat belt assembly after encapsulation in accordance with an embodiment of this invention;

FIG. 4 is a cross-sectional view along section line IV—IV of FIG. 3;

FIG. 5 is a frontal perspective view of a seat belt assembly in accordance with another embodiment of this invention.

FIG. 6 is a cross-sectional view taken along section line VI—VI of FIG. 5;

FIG. 7 is an exploded side elevational view of the metal straps of the seat belt assembly in accordance with the FIG. 5 embodiment of this invention; and FIG. 8 is a perspective view of the seat belt assembly including seat belt fastening devices.

DETAILED DESCRIPTION

Referring to the drawings, a seat belt assembly 30 includes an elongated, flat steel strap 10 having a longitudinal recessed channel 17 for carrying a pair of electrically conducting wires 16. Strap 10 includes a relatively straight body 19 and an anchor flange 20 integrally connected to and angled from body 19. A connector portion 27 curving from body 19 at the opposite extremity of body 19 from anchor flange 20 provides a point for securing a seat belt latch or buckle thereto. Anchor flange 20 includes an opening 11 extending through and perpendicular to the flat sides of flange 20 for passing a bolt so steel strap 10 can be connected to a vehicle. Connector 27 has an opening 28 extending therethrough and is adapted to be connected to a seat belt buckle or latch. A channel opening 18 is formed at the base of channel 17 to allow wires 16 to pass from one side of strap 10 to the other side.

A second steel strap 12 serves as a flat, elongated cover closing channel 17 and holding wires 16 in place. Second strap 12 includes an anchor flange 13, substantially shaped as anchor flange 20, including an opening 14 aligning with opening 11. At the opposite end of second strap 12 from anchor flange 13 is a connector portion 15 which is connected to the buckle or latch of a second seat belt. Second strap 12 is longitudinally aligned with strap 10 to cover channel 17. Advantageously, for structural strength, second strap 12 is welded to first strap 10. Thus, cover strap 12 serves two functions: one to cover channel 17 and hold wires 16 in place and second to serve as a second seat belt.

For example, this assembly would be located on the inboard side of the driver's or passenger's seat. The latch for the driver's belt might be bolted to connector 27 and wired to conductors 16. The buckle for the middle seat belt would be bolted to connector portion 15. If there is no middle seat, connector portion 15 could simply be left off strap 12.

Straps 10 and 12 are preferably made of steel, as noted above. However, materials having comparable strength and heat resistance could be employed. Such materials must have sufficient strength to resist breaking in the event of automobile impact, so as to securely hold a person using the seat belt in place. They must have sufficient heat resistance so that they will not be deteriorated or melt when the above described assembly is encapsulated. In other words, the materials of straps 10 and 12 must be sufficiently heat resistant to hold up when an encapsulating plastic material coating 21 is molded around the assembly of straps 10, 12 and wires 16.

The encapsulating molding operation is preferably performed by dip molding. The assembled straps 10 and 12 and wiring 16 are dip molded in a conventional manner in a vinyl dip tank. One vinyl composition which will give a suede-like finish is described and claimed in the U.S. Pat. No. 3,584,096.

The encapsulating plastic coating 21 could also be applied by injection molding. In such an operation, the assembled straps 10, 12 and wiring 16 would be placed in an injection mold and plastic coating 21 injected thereabout.

Encapsulating plastic coating 21 includes an enlarged bolt cover portion 22 (FIG. 3) which is an integral, hingedly connected concave cap adapted to fit over anchor flange 20 and to cover the head of a bolt passing through openings 11 and 14. Bolt cover 22 is hinged to the remainder of coating 21 along a line parallel to the junction of anchor flange 20 with scrap body 19. Bolt cover 22 can be molded in an injection molding operation in the manner described in my co-pending patent application, Ser. No. 733,757, entitled SEAT BELT ASSEMBLY CONNECTION AND METHOD FOR FABRICATING, assigned to the assignee of the present application. The description and drawings of said co-pending patent application are hereby specifically incorporated by reference.

Because this assembly 30 is encapsulated by a molding in place operation, it is importatnt that each of the wires 16 include a heat resistant insulating material 23 covering and insulating internal conductors 24 of wires 16. For example, asbestos insulation may be used. If the insulating material 23 is not heat resistant, it will melt during the encapsulating process and the resulting short circuit will cause the seat belt warning light system to malfunction.

FIG. 5 discloses an alternative embodiment assembly 30a employing straps 10a and 12a which are identical in function to straps 10 and 12 of embodiment 30, except that: (1) they are twisted at 26 so that the upper portion extends in a plane at right angles to the lower portion, and (2) steel strap 12a also includes a recessed longitudinal channel 17b which corresponds to either recessed channels 17 or 17a straps 10 or 10a, respectively (see in particular FIGS. 6 and 7).

The reason for the twist is so the anchor flanges 20a and 13a can be anchored to the floor behind the seat with straps 10a and 12a extending upwardly between the seat in the back and then turning at right angles so that the connector end portions 27a and 15a respectively have a generally proper orientation for securing a seat belt latch or buckle thereto. FIG. 8 shows assembly 30a with a latch mechanism 80 attached at 27a and a buckle 90 attached at 15a.

The second channel 17b in strap 12a concerns either of two alternative functions. First, by providing two recessed channels disposed opposite one another, both can be somewhat smaller and less obtrusive than would be a single recessed channel 17 in only the single strap 10. In the alternative, the channels could be approximately the same size as either one alone and two pairs of wires 16 could be disposed within the recesses formed by the two opposing channels 17a and 17b for the purposes of wiring a latch secured to the ends of both straps 10a and 12a. At one or the other of the sides of the middle seat, there have to be two latches side by side.

Various modifications will no doubt occur to those skilled in the art to which this invention pertains. For example, the particular cross-sectional shape of the channel and the particular coupling of the anchor assembly to the seat belt and to the vehicle may be varied from that disclosed herein. These and all other variations which basically rely on the teachings by which this disclosure has advanced the art are properly considered within the scope of this invention.

The embodiments of the invention in which an exclusive property or privilege is claimed are defined as follows.

1. A seat belt assembly comprising:
   an elongated metal strap adapted to be coupled to a seat belt fastener at a first extremity and adapted to be coupled to a vehicle at a second extremity;
   electrical conductor means lying adjacent and extending along the length of said strap; and
   said strap and conductor means being molded in place in a plastic material which directly contacts and encapsulates said conductor means and which defines a cover encapsulating said strap and conductor means.

2. A seat belt assembly as recited in claim 1 wherein said elongated metal strap includes a first longitudinal recessed channel for receiving said electrical conductor means.

3. A seat belt assembly as recited in claim 2 wherein said conductor means includes a heat resistant coating of sufficient heat resistance so said coating does not deteriorate during molding of said encapsulating cover around said strap and conductor means.

4. A seat belt assembly as recited in claim 3 wherein said metal strap includes an elongated, generally flat strap body having said first recessed channel, a first extremity including a flat, integral, elongated strap connector curved from said body for coupling to a seat belt latch or buckle, and a second extremity including a flat, elongated integral anchor flange angled from said body and has a coupling opening adapted for passing coupling means to couple said seat belt assembly to the vehicle.

5. A seat belt assembly as recited in claim 4 wherein said channel includes an opening through said metal strap for passing said conductor means from a first side of said metal strap to a second side of said metal strap.

6. A seat belt assembly as recited in claim 3 wherein said heat resistant coating is fabricated of asbestos.

7. A seat belt assembly as recited in claim 1 wherein said conductor means includes a heat resistant coating of sufficient heat resistance so said coating does not deteriorate during said molding of said encapsulating cover around said strap and conductor means.

8. A seat belt assembly comprising:
   an elongated metal strap adapted to be coupled to a seat belt buckle or latch at a first extremity and adapted to be coupled to a vehicle at a second extremity;
   said metal strap including an elongated, generally flat strap body having a first longitudinal channel providing a recessed passageway along said metal strap, said first extremity including a flat, integral, elongated metal strap connector curved from said body, and said second extremity including a flat, elongated, integral anchor flange angled from said body and having a coupling opening adapted for passing coupling means to couple said metal strap to the vehicle;
   said channel including an opening through said metal strap in proximity to an extremity of said channel;
   an electrical conductor means positioned in said first longitudinal channel;
   a flat, elongated metal cover strap welded to said metal strap, aligned with said body, covering said channel, having at a first extremity a metal cover strap connector, curving away from said body and adapted to be coupled to a seat belt buckle or latch, and having at a second extremity an anchor cover flange substantially aligned with said anchor flange and a cover opening, extending through said anchor flange, substantially aligned with said coupling opening;
   a molded coating means encapsulating said conductor means and said metal strap and said metal cover strap; and
   said electrical conductor means includes a heat resistant coating of sufficient heat resistance so said heat resistant coating does not deteriorate during the molding of said molded coating means around said metal strap and metal cover strap.

9. A seat belt assembly as recited in claim 8 wherein:
   said metal strap and said metal cover strap have a longitudinal twist intermediate said first extremity and said second extremity so said first extremity is rotated with respect to said second extremity; and
   said metal strap cover includes a second recessed, longitudinal channel opening toward said first longitudinal channel for receiving said conductor means.

* * * * *